United States Patent
Navas et al.

(10) Patent No.: US 7,270,722 B2
(45) Date of Patent: Sep. 18, 2007

(54) PLACEMENT PROCESS FOR ELEMENTS OF A SELF-STIFFENED PANEL OF PREIMPREGNATED COMPOSITE

(75) Inventors: Georges Navas, Orvault (FR); Jean-Paul Petetin, Colomiers (FR); Michle Fontayne, Brax (FR); Pierre Lafon, Toulouse (FR); Guy Hellard, Blagnac (FR)

(73) Assignee: Airbus France, Toulouse (FR)

( * ) Notice: Subject to any disclaimer, the term of this patent is extended or adjusted under 35 U.S.C. 154(b) by 491 days.

(21) Appl. No.: 10/999,797

(22) Filed: Nov. 30, 2004

(65) Prior Publication Data

US 2005/0166501 A1 Aug. 4, 2005

(30) Foreign Application Priority Data

Dec. 4, 2003 (FR) .................................. 03 14253

(51) Int. Cl.
*B32B 1/10* (2006.01)
*B32B 31/16* (2006.01)

(52) U.S. Cl. ...................... 156/214; 156/212; 156/224; 156/226

(58) Field of Classification Search ..................... None
See application file for complete search history.

(56) References Cited

U.S. PATENT DOCUMENTS 5,538,589 A  7/1996 Jensen et al.

FOREIGN PATENT DOCUMENTS

GB  2 105 254  3/1983

*Primary Examiner*—Sam Chuan C. Yao
(74) *Attorney, Agent, or Firm*—Patterson, Thuente, Skaar & Christensen, P.A.

(57) ABSTRACT

A process for placing elements of a self-stiffened panel of preimpregnated composite. The panel includes a base skin and a plurality of U-shaped stiffeners, with an interfacing structure including a nail and a nail-head. The process includes draping plies to form the base skin; placing and shaping at least one reinforcing ply on a set of punches; forming half-nails; placing a half-nail on the sides of each punch covered by the reinforcing ply; positioning the punches side by side in inverted U-positions; placing the nail-heads; compacting the set of punches; turning the punches 180 degrees; positioning the set of punches on the base skin; and withdrawing the set of U-shaped punches.

2 Claims, 2 Drawing Sheets

US 7,270,722 B2

PLACEMENT PROCESS FOR ELEMENTS OF A SELF-STIFFENED PANEL OF PREIMPREGNATED COMPOSITE

RELATED APPLICATION

The present application claims priority to French Application No. 03 14253 filed Dec. 4, 2003.

TECHNICAL FIELD

The present invention concerns the manufacture of self-stiffened panels comprised of layers of preimpregnated fibers and intended for construction of wing panels and fuselage boxes, for example.

SUMMARY OF THE INVENTION

More specifically, the self-stiffened panels according to the invention consist of a skin and generally formed by several superimposed plies of preimpregnated carbon fibers, on one side of which U-shaped stiffeners are added and arranged side by side, and the parts joining the branches of the U are flattened against the skin with interposition, between the adjoining branches of two adjacent stiffeners, of an interfacing structure commonly called a nail, completed by a nail-head made up of a cord of filling resin.

The invention concerns the manufacture of this type of self-stiffened panel and, more specifically, the stages for placement of the elements of such panel during their manufacture.

For this purpose, the subject of the invention is a process for placement of the elements of a self-stiffened panel of pre-impregnated composite of a type comprised of a base skin, on one side of which U-shaped stiffeners are added and placed side by side, and the parts connecting the branches of the U are flattened against said skin, with interposition, between the adjoining branches of adjacent stiffeners, of an interfacing structure commonly called a "nail," completed by a "nail-head" made up of a cord of filling resin, characterized by the following steps:

draping of several superimposed plies of preimpregnated carbon fiber to make up said base skin;

placement and shaping of at least one reinforcing ply of preimpregnated carbon fibers on individual punches with a U-shaped cross-section and rounded corners and a length corresponding to that of the U-shaped stiffeners for the panel to be made;

design of half-nails comprised of a band, the length of which corresponds to that of the U-shaped stiffeners and a width equal to the height of the branches of said U and having a longitudinal flange by draping at least one ply of preimpregnated carbon fibers;

placement of a half-nail, the flange edges of which are placed near the punches' rounded corners, on both sides of each punch covered by said reinforcing ply and in inverted U-position;

positioning side by side of punches in inverted U-position and placement of a nail-head with a roughly triangular cross-section between two adjoining flanges compacting of the set of punches thus placed side by side;

turnover by 180° of the set of compacted punches;

positioning of this unit on said base skin so as to flatten against the latter a continuous flat surface defined, in part, by the outer side of the parts connecting the branches of the Us of reinforced plies, and on the other hand by the "nail+nail-head" unit separating two adjacent stiffeners;

and, finally, withdrawal of said U-shaped punches.

According to a specific manufacturing method, the step of making the half-nails consists of placement and flattening against a punch with a U-shaped cross-section and rounded corners of the said band such that the two opposing longitudinal edges of the latter go slightly beyond the punch, and then cutting the band along its longitudinal axis in order to obtain symmetric half-nails.

BRIEF DESCRIPTION OF THE DRAWINGS

Below, the preferred manufacturing method according to the invention is described, making reference to the following attached drawings.

DETAILED DESCRIPTION OF THE DRAWINGS

Figure 1:
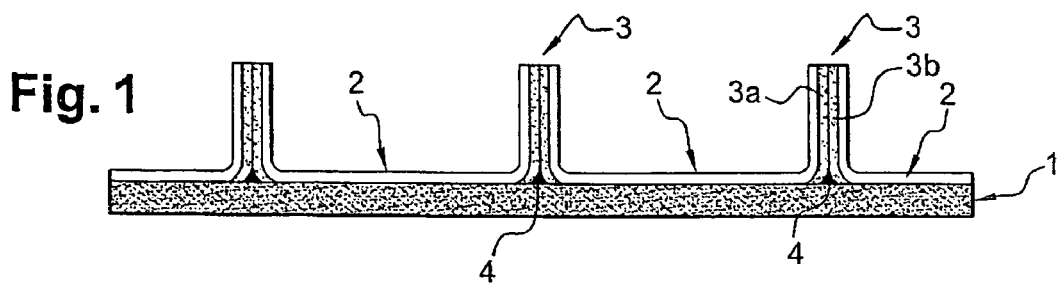
FIG. 1 is a partial cross-section of a self-stiffened panel with the U-shaped stiffeners added to a base skin.

In FIG. 1, a cross-section of a self-stiffened panel of preimpregnated composite made up of a base skin 1 on one face of which are added U-shaped stiffeners 2 placed in parallel and side by side and separated from each other by an interfacing structure including a nail 3 and a nail-head 4 are shown; the nail is formed from two half-nails 3a and 3b placed symmetrically, and the nail-head 4 filling the space remaining between the skin 1, on the one hand, and the adjoining edges of the half-nails 3a and 3b on the other hand.

The skin 1, like the U-shaped stiffeners 2 and the half-nails 3a and 3b, is made up by piling up plies formed of carbon fiber tissues or layers preimpregnated with an appropriate resin.

The stiffeners 2, the half-nails 3a and 3b, and the nail-heads 4 generally run the entire length of the panel.

Figure 2:
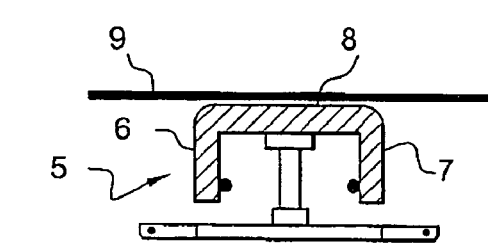
FIG. 2 illustrates the placement of a ply on a punch with a U-shaped section.

FIG. 2 illustrates the first step of placing the panel's reinforcing elements. The base skin 1 was made elsewhere according to the conventional technique of draping.

In FIG. 2, a punch at 5 is shown, the cross-section of which is U-shaped defining three flat outer surfaces that are orthogonal or parallel to each other. Respectively, the surfaces 6 and 7 correspond to the two parallel branches of the U and a connecting surface 8.

The punch 5 has a length at least equal to that of the stiffeners 2 to be made and is placed in the inverted U-position for the placement of the superimposed plies shaped in rectangular bands before making up the stiffeners.

Figure 9:
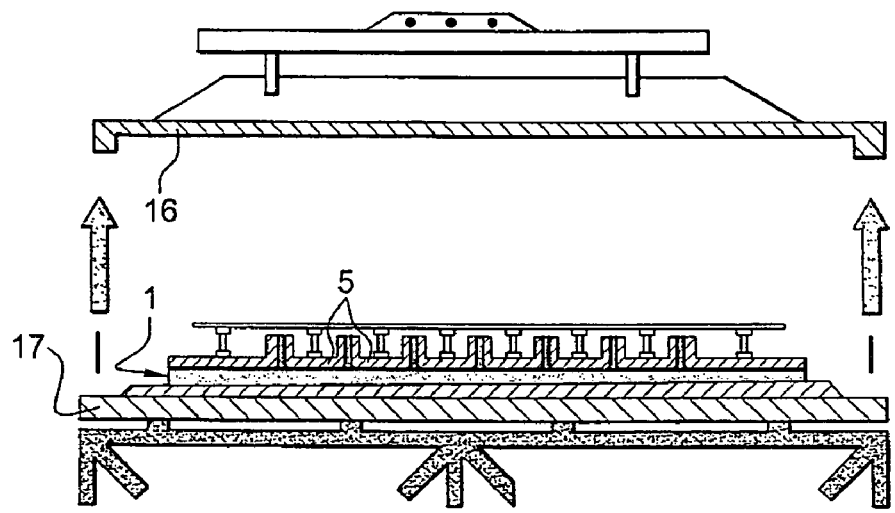

FIG. 9 shows a cross-section of such a superposition made by draping and shaping a band, the length of which is equal to that of the U-shaped stiffener to be made.

The band 9 is placed, as illustrated, astride punch 5, previously coated with a polyethylene film (not shown) to avoid sticking of the band 9 and allowing the later withdrawal of the punch, in order to form under infrared the U-shaped stiffener by flattening the edges of the band 9 on the sides 6 and 7 of the punch; the longitudinal edges of the band 9 are cut to fit the height of the said sides 6 and 7.

Figure 3:
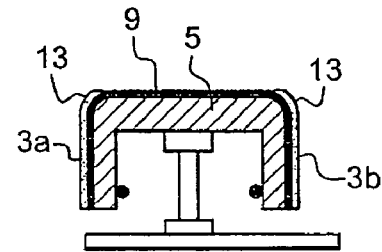
FIG. 3 shows the punch from FIG. 2 covered with the U-shaped reinforcing ply and flanked laterally by two half-nails.

FIG. 3 illustrates the following step of placing a half-nail 3a and 3b, previously shaped and cut out, on both sides of punch 5 previously coated with band 9.

Figure 5:
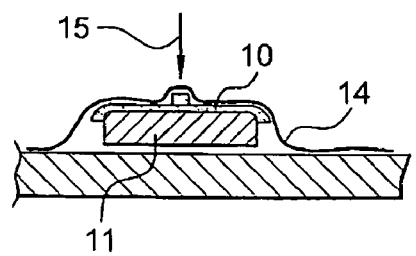
FIGS. 5, 6, and 7 illustrate a method of making the half-nails.
Figure 6:
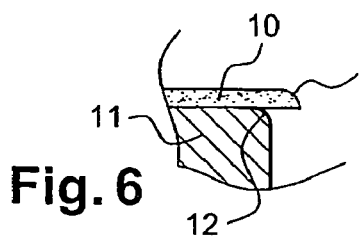
Figure 7:
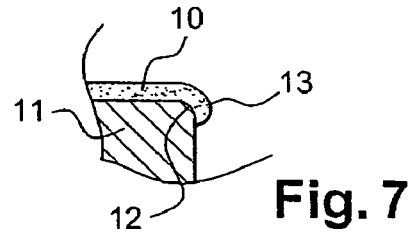

Following a preferred manufacturing method illustrated by FIGS. 5 to 7, the half-nails 3a and 3b are obtained from a single band 10 placed on a shaping jig 11 with a rectangular cross-section and rounded upper edges 12 (FIGS. 6 and 7), with the band's longitudinal edges 13 going slightly over (FIG. 6).

Next, a bladder 14 is placed on the assembly and vacuum is applied to form the half-nails, this means flattening (FIG. 7) the band's 10 edges 13 on the rounded corners 12, after which the band 10 is cut along its longitudinal axis (arrow 15) to separate the two half-nails 3a and 3b.

Figure 4:
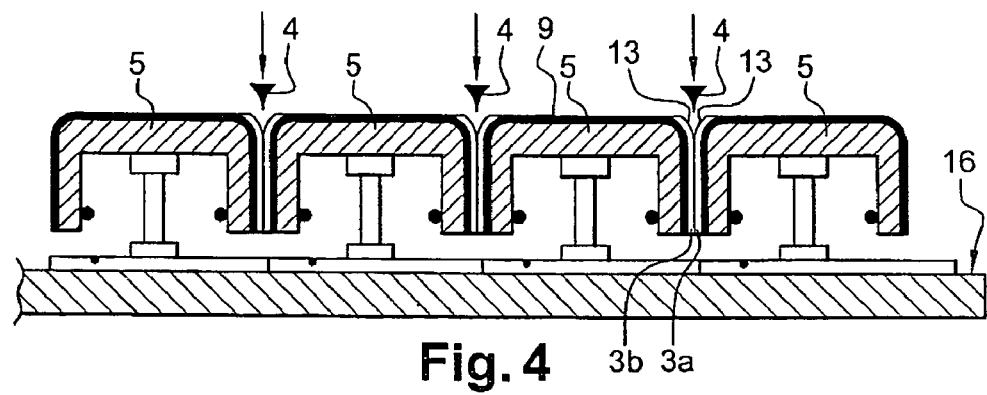
FIG. 4 shows for U-shaped punches according to FIG. 3 placed side by side for the purpose of placing nail-heads.

The next step consists of placing, as shown in FIG. 4, several punches according to FIG. 3, parallel, side by side, and still in inverted U-position, in order to place a nail-head 4 previously prepared and made up of a cord of filling resin with a more or less triangular cross-section between two adjacent punches; the nail-head fills the channel formed between the two flanged edges 13 of the half-nails 3a and 3b flattened against the band 9.

The unit is then placed under a bladder (not shown) and compacted under vacuum in order to have a surface as uniformly flat as possible and free of spaces or empty interstices around the nail-nail-head assembly.

Figure 8:
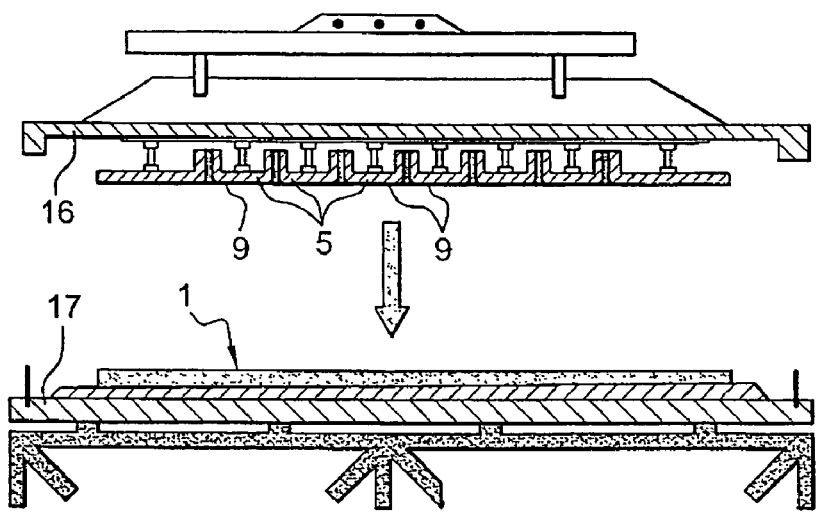
FIGS. 8, 9, and 10 illustrate the final steps of placing the stiffeners-nails-nail-heads unit on a base skin and withdrawing the punches.
Figure 10:
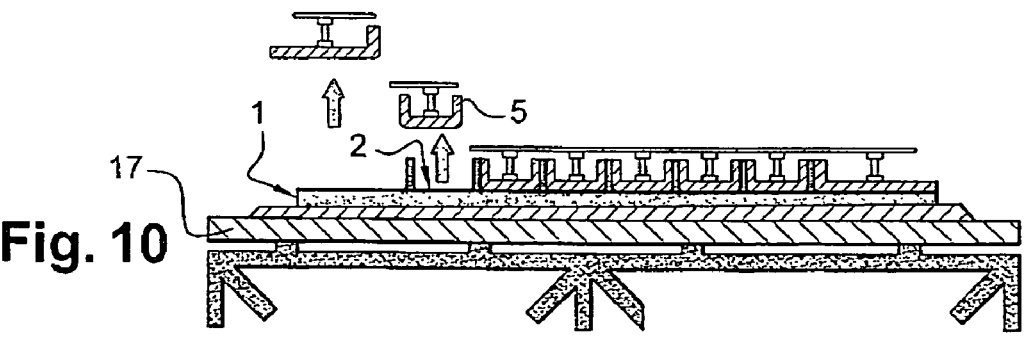

The next step consists of returning the set of punches 5 to an upright U-position by turning over by 180 degrees, as shown by FIG. 8, the punches' 5 mounting plate 16, and then positioning the latter over the base skin 1 placed on its waiting surface plate 17. Next, the set of punches 5 is placed on the skin 1 (FIG. 9) and, finally, the punches 5 are lifted away one after the other (FIG. 10) in order to obtain an assembly structure, according to FIG. 1, which it is next appropriate to strengthen in an autoclave in the normal manner.

The invention claimed is:

1. A placement process for elements of a self-stiffened panel of preimpregnated composite having a base skin, a plurality of substantially U-shaped stiffeners placed side by side on a first side of the base skin, adjoining branches of adjacent stiffeners interposed by an interfacing structure and a portion connecting the branches being flattened against the base skin, the interfacing structure comprising a nail having a nail-head comprised of a cord of filling resin, the process comprising the steps of:

draping a plurality of superimposed plies of preimpregnated carbon fiber to form the base skin;

placing and shaping at least one reinforcing ply of preimpregnated carbon fibers on each of a set of individual punches, the punches having substantially U-shaped cross-sections and rounded corners and a length corresponding to a length of the U-shaped stiffeners;

forming at least one half-nail comprising a band having a length corresponding to the length of the U-shaped stiffeners and a width corresponding to a height of the branches of the U-shaped stiffeners and having a longitudinal flange, by draping at least one ply of preimpregnated carbon fibers;

placing a half-nail on each side of each punch, the punches covered by the reinforcing ply and arranged in an inverted U position, with a flange edge of each half-nail placed proximate the rounded corner of each punch;

positioning the set of punches side-by-side in inverted U positions and placing a nail-head having a substantially triangular cross-section between adjoining flanges;

compacting the set of punches;

rotating the set of compacted punches about 180 degrees;

positioning the set of punches on the base skin to flatten, against the base skin, a continuous flat surface defined in part by an outer surface of a connecting portion of the reinforcing plies and in part by the interfacing structure of the nail and nail-head interposed between adjacent U-shaped stiffeners; and withdrawing the set of punches.

2. A process according to claim 1, wherein the step of forming the half-nails further comprises:

placing and flattening the band against the punch with two opposite longitudinal edges of the band extending slightly beyond the punch; and cutting the band along a longitudinal axis of the band in order to form two substantially symmetric half-nails.

\* \* \* \* \*